United States Patent
Ou et al.

(10) Patent No.: US 10,190,575 B2
(45) Date of Patent: Jan. 29, 2019

(54) METHOD, DEVICE AND SYSTEM FOR COMPENSATING OUTPUT POWER OF WIND TURBINE GENERATOR SET

(71) Applicant: BEIJING GOLDWIND SCIENCE & CREATION WINDPOWER EQUIPMENT CO., LTD., Beijing (CN)

(72) Inventors: Fashun Ou, Beijing (CN); Jian Li, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/539,429

(22) PCT Filed: Nov. 17, 2015

(86) PCT No.: PCT/CN2015/094823
§ 371 (c)(1),
(2) Date: Jun. 23, 2017

(87) PCT Pub. No.: WO2016/107314
PCT Pub. Date: Jul. 7, 2016

(65) Prior Publication Data
US 2017/0356419 A1 Dec. 14, 2017

(30) Foreign Application Priority Data
Dec. 30, 2014 (CN) .......................... 2014 1 0838656

(51) Int. Cl.
F03D 7/02 (2006.01)
F03D 9/25 (2016.01)
F03D 7/04 (2006.01)

(52) U.S. Cl.
CPC ............. *F03D 9/255* (2017.02); *F03D 7/028* (2013.01); *F03D 7/043* (2013.01);
(Continued)

(58) Field of Classification Search
CPC .......... F05B 2270/325; F05B 2270/303; F05B 2270/1033; F03D 7/0284; F03D 9/257
See application file for complete search history.

(56) References Cited

U.S. PATENT DOCUMENTS 7,476,987 B2 1/2009 Chang
9,018,782 B2 4/2015 Couchman et al.
(Continued)

FOREIGN PATENT DOCUMENTS

CN 102767473 A 11/2012
CN 102954858 A 3/2013
(Continued)

OTHER PUBLICATIONS

International Search Report dated Feb. 24, 2016; PCT/CN2015/094823.
(Continued)

Primary Examiner — Sean Gugger
(74) Attorney, Agent, or Firm — Ladas & Parry LLP

(57) ABSTRACT

A method for compensating the output power of wind turbine generator set includes acquiring the average values of the first ambient temperature of environments where the wind turbine generator set is located in various periods; collecting the output power of the wind turbine generator set at the end time of various periods; compensating the set output power collected at the end time of current period according to difference value between the average value of the first ambient temperature in the current period and that in the previous period so as to guarantee the stability of the set output power if the average value of the first ambient
(Continued)

temperature in the current period and the average value of the first ambient temperature in the previous period both are higher than a preset temperature threshold value.

11 Claims, 10 Drawing Sheets

(52) U.S. Cl.
CPC . *F05B 2270/1033* (2013.01); *F05B 2270/303* (2013.01); *F05B 2270/325* (2013.01); *F05B 2270/335* (2013.01); *Y02E 10/723* (2013.01); *Y02E 10/725* (2013.01)

(56) References Cited

U.S. PATENT DOCUMENTS

| | | | |
|---|---|---|---|
| 2004/0135375 A1 | 7/2004 | Wobben | |
| 2008/0112807 A1 | 5/2008 | Uphues et al. | |
| 2010/0140938 A1* | 6/2010 | Cook | F03D 7/043 290/44 |
| 2011/0077787 A1* | 3/2011 | Yasugi | F03D 7/0284 700/287 |
| 2011/0089692 A1* | 4/2011 | Girardin | F03D 7/0264 290/44 |
| 2012/0055247 A1 | 3/2012 | Gonzalez Castro | |
| 2013/0209220 A1 | 8/2013 | Nielsen | |
| 2013/0270827 A1 | 10/2013 | Couchman et al. | |
| 2014/0015252 A1 | 1/2014 | Zhu et al. | |
| 2014/0100800 A1 | 4/2014 | Prats Mustaros | |
| 2014/0212289 A1 | 7/2014 | Thogersen et al. | |
| 2014/0257751 A1* | 9/2014 | Edenfeld | F03D 17/00 702/183 |

FOREIGN PATENT DOCUMENTS

| | | |
|---|---|---|
| CN | 103244351 A | 8/2013 |
| CN | 103782143 A | 5/2014 |
| CN | 104564529 A | 4/2015 |
| EP | 1918581 A2 | 5/2008 |
| EP | 2128385 A2 | 12/2009 |
| EP | 2719895 A1 | 4/2014 |

OTHER PUBLICATIONS

Written Opinion of the International Searching Authority dated Feb. 24, 2016; PCT/CN2015/094823.
The First Chinese Office Action dated Jan. 16, 2017; Appln. No. 201410838656.0.
Extended European Search Report dated Jul. 16, 2018; Appln. No. 15874994.5.

* cited by examiner

US 10,190,575 B2

METHOD, DEVICE AND SYSTEM FOR COMPENSATING OUTPUT POWER OF WIND TURBINE GENERATOR SET

CROSS-REFERENCE TO RELATED APPLICATIONS

This application is a National Stage application of PCT international application PCT/CN2015/094823, filed on Nov. 17, 2015, which claims priority to Chinese Patent Application No. 201410838656.0, filed with the Chinese Patent Office on Dec. 30, 2014, both of which are incorporated herein by reference in their entireties.

TECHNICAL FIELD

The present disclosure relates to the technical field of wind power, and in particular to a method, a device and a system for compensating an output power of a wind turbine.

BACKGROUND

With continuous improvement of an installed capacity of a wind turbine (referred to as "WT" for short), performances of the wind turbine have increasingly high requirements in an industry. In a control strategy for a rotational speed and a torque of the wind turbine in a rotational speed of a full power, a gain value is used to track the maximum wind energy utility capture. The better the match between the gain value and actual wind energy resources, the more accurate the wind energy capture in the control strategy of the wind turbine. Thus, a power generation capacity of the wind turbine may be improved. If the gain value deviates from the actual wind energy resource, the effect of the control strategy is influenced and wind energy capture of the wind turbine is reduced, thereby reducing the power generation capacity of the wind turbine. Parameters closely related to the gain value include parameters closely related to performances of the wind turbine itself, such as a tip speed ratio and a wind energy utilization factor; and parameters closely related to wind resources, such as an air density. The parameters such as the tip speed ratio and the wind energy utilization factor are fixed with the completion of the design of the wind turbine, which are difficult to be improved in the design and control. The air densities in wind farms at different geographical positions are different.

In the conventional control strategy, an annual average air density is generally used, or an annual average air density calculated from an annual average temperature is used. Then the gain value in the control strategy for the rotational speed and the torque is calculated based on the annual average air density. Since the air density is influenced greatly by seasons and humidity, the gain value calculated in this method generally deviates from the actual value greatly. In addition, the following case is not considered in the method: at different terrain conditions, different wind turbines have different output powers and self-consumption powers in different seasons, thereby resulting in personalization differences of the gain values.

SUMMARY

A method, device and system for compensating an output power of a wind turbine are provided according to embodiments of the present disclosure, to compensate the output power of the wind turbine in operation, to ensure a stable output power of the wind turbine.

In order to achieve the above object, a method for compensating an output power of a wind turbine is provided according to an embodiment of the present disclosure, which includes:

acquiring average values of first ambient temperatures of environments where the wind turbine is located, in respective periods;

collecting output powers of the wind turbine at end time instants of the respective periods; and if both an average value of the first ambient temperatures in a current period and an average value of the first ambient temperatures in a previous period are greater than a preset temperature threshold, compensating an output power of the wind turbine collected at an end time instant of the current period based on a difference between the average values of the first ambient temperatures in the current period and the previous period, to ensure a stable output power of the wind turbine, where the temperature threshold is an ambient temperature value when the wind turbine is in a full power state; and where in the full power state, the wind turbine has a grid-connected power equal to a rated power.

A device for compensating an output power of a wind turbine is further provided according to an embodiment of the present disclosure, which includes:

a first acquiring module configured to acquire average values of first ambient temperatures of environments where the wind turbine is located, in respective periods;

a first collecting module configured to collect output powers of the wind turbine at end time instants of the respective periods; and a compensating module configured to if both an average value of the first ambient temperatures in a current period and an average value of the first ambient temperatures in a previous period are greater than a preset temperature threshold, compensate an output power of the wind turbine collected at an end time instant of the current period based on a difference of the average values of the first ambient temperatures in the current period and the previous period, to ensure a stable output power of the wind turbine, where the temperature threshold is an ambient temperature value when the wind turbine is in a full power state; and where in the full power state, the wind turbine has a grid-connected power equal to rated power.

A system for compensating output powers of wind turbines is further provided according to an embodiment of the present disclosure, which includes: a cluster controller and stand-alone controllers provided on the respective wind turbines, where each of the stand-alone controllers includes:

a stand-alone acquiring module configured to acquire average values of first ambient temperatures of environments where the wind turbine is located, in respective periods;

a stand-alone collecting module configured to collect output powers of the wind turbine at end time instants of the respective periods; and a stand-alone compensating module configured to compensate an output power of the wind turbine collected at an end time instant of a current period in response to control of the cluster controller, and the cluster controller includes:

a cluster acquiring module configured to acquire from the stand-alone controller the average values of the first ambient temperatures of the environments where the wind turbine including the stand-alone controller is located, in the respective periods;

a cluster collecting module configured to collect the output powers of the wind turbine at the end time instants of the respective periods from the stand-alone controller; and a cluster compensating module configured to if both an average value of the first ambient temperatures of the wind turbine in a current period and an average value of the first ambient temperatures in a previous period are greater than a preset temperature threshold of the wind turbine, control a corresponding stand-alone controller to compensate the output power of the wind turbine collected the an end time instant of the current period based on a difference between the average values of the first ambient temperatures of the wind turbine in the current period and the previous period, to ensure a stable output power of the wind turbine, where the temperature threshold is an ambient temperature value when the wind turbine is in a full power state; and where in the full power state, the wind turbine has a grid-connected power equal to a rated power.

With the method, device and system for compensating the output power of the wind turbine according to the embodiments of the present disclosure, the output power of the wind turbine is compensated based on the introduced temperature threshold and a change of the output powers of the wind turbine with the ambient temperatures, to ensure the stable output power of the wind turbine. The technical solutions according to the embodiments of the present disclosure may be applied to various types of wind turbine.

DETAILED DESCRIPTION OF EMBODIMENTS

First Embodiment

Figure 1:
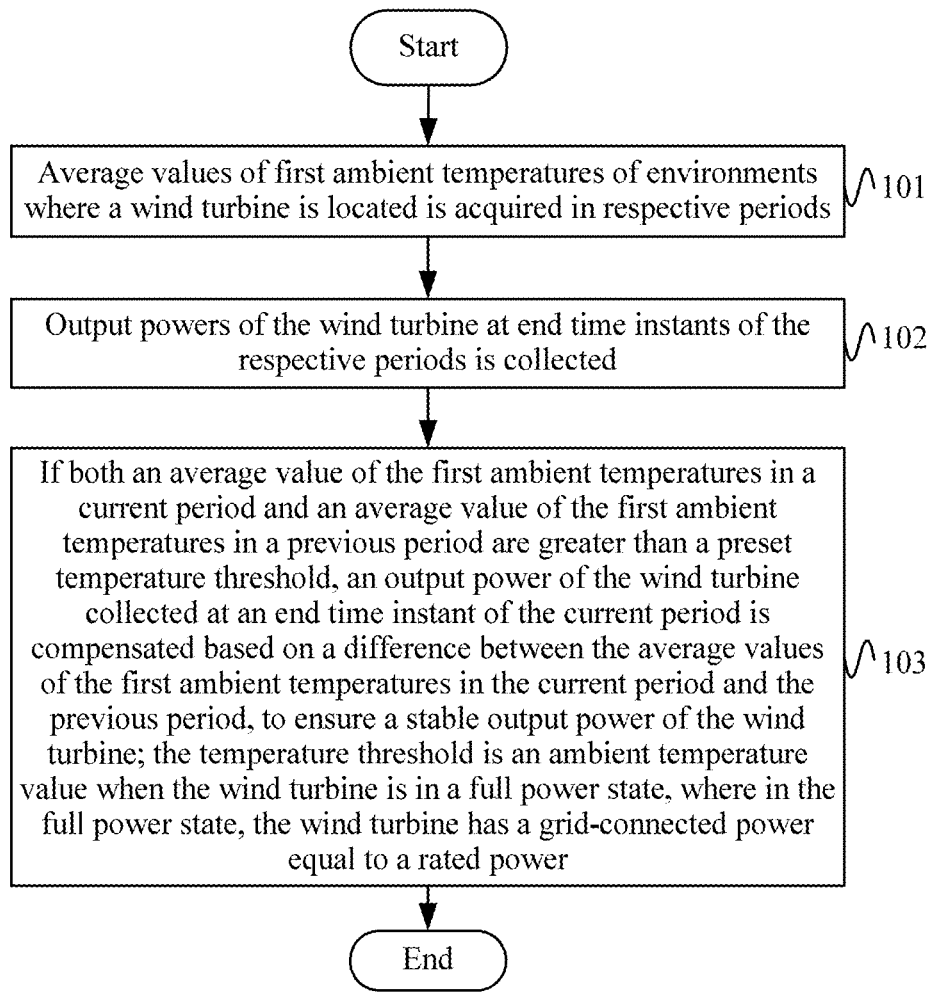
FIG. 1 is a flowchart of a method for compensating an output power of a wind turbine according to an embodiment of the present disclosure.

FIG. 1 is a flowchart of a method for compensating an output power of a wind turbine according to an embodiment of the present disclosure. The method may be performed by an output power compensating system of the wind turbine or a compensating device or module integrated in the system. As shown in FIG. 1, the method for compensating an output power of a wind turbine includes steps S101 to S103 in the following.

In step S101, average values of first ambient temperatures of environments where the wind turbine is located is acquired in respective periods.

At least one sampling time instant may be set for each of the periods. At each of multiple sampling time instants, a temperature of an environment where the wind turbine is located is measured by a temperature measuring device as a first ambient temperature, and an average value of the first ambient temperatures in the period is obtained by calculating a weighted average value or an algebraic average value of all measured first ambient temperatures in the period.

In step S102, output powers of the wind turbine at end time instants of the respective periods are collected.

The output power of the wind turbine refers to a value of electrical energy which is converted from wind energy absorbed by a blade in unit time. The output power is influenced by a wind energy utilization coefficient of the blade and a mechanical transmission efficiency of the wind turbine. In an actual application scene, the grid-connected power, i.e., a power to be transmitted to a power grid, is obtained by subtracting a self-consumption power from the output power of the wind turbine. The three types of powers meet the following relation:

wind turbine output power−self-consumption power=grid-connected power.

When the grid-connected power is greater than or equal to a rated power of the wind turbine itself, the wind turbine supplies power to an external power grid with the rated power; and when the grid-connected power is less than the rated power of the wind turbine itself, the wind turbine supplies power to the external power grid with the grid-connected power.

In the actual application scene, the self-consumption power of the wind turbine refers to a power consumed by electrical components of the wind turbine in a normal operation. A value of the self-consumption power is related to operation states of the electrical components. In addition to the electrical components of the wind turbine, the output power of the wind turbine is closely related to an ambient environment, and the ambient temperature influences the output power of the wind turbine more obviously. This is because as the ambient temperature rises, an air density decreases, thereby resulting in that the output power of the wind turbine is reduced at the same wind speed. Accordingly, in a high ambient temperature, the wind turbine needs to consume more energy to dissipate heat, resulting in a high self-consumption power of the wind turbine. Both a decrease of the output power of the wind turbine and an increase of the self-consumption power result in a decrease of the grid-connected power of the wind turbine, which may be regarded as a decrease of the output power of the wind turbine equivalently.

Thus, if a rule for change of the output powers of the wind turbine with the ambient environments is found, the output power of the wind turbine can be compensated in response to change of the ambient temperatures, to ensure the stable output power of the wind turbine and stabilize the grid-connected power of the wind turbine. In this way, a power generation capacity of the wind turbine transmitted to the external power grid is stable. In step S103, if both an average value of the first ambient temperatures in a current period and an average value of the first ambient temperatures in a previous period are greater than a preset temperature threshold, an output power of the wind turbine collected at an end time instant of the current period is compensated based on a difference of the average values of the first ambient temperatures in the current period and the previous period, to ensure the stable output power of the wind turbine. The temperature threshold is an ambient temperature value when the wind turbine is in a full power state, where in the full power state, the wind turbine has a grid-connected power equal to a rated power.

In an actual application scene, an actual output power of the wind turbine is inversely proportional to the ambient temperature. It is means that in winter with a low temperature, the wind turbine has a high output power, and the grid-connected power in winter obtained by subtracting the average self-consumption power of the wind turbine itself from the output power of the wind turbine is higher than a rated power of the wind turbine, such that the wind turbine can supply power to an external power grid with the rated power. In summer, particularly in a high temperature, the wind turbine has a low output power, the grid-connected power of the wind turbine in summer obtained by subtracting the average self-consumption power of the wind turbine itself from the output power of the wind turbine may be lower than the rated power of the wind turbine, and the wind turbine can only supply power to the external power grid with the actual grid-connected power, thereby reducing of a total power generation capacity of the wind turbine. During a continuous temperature rising period from winter to summer, or during a continuous temperature fall period from summer to winter, there is a specific temperature point certainly in a full power state. At this temperature point, a difference between the output power of the wind turbine and the average self-consumption power is exactly equal to the rated power of the wind turbine. This temperature point is set as the temperature threshold in the embodiment.

In the full power state of the wind turbine, when the ambient temperature is higher than the above temperature threshold, a current output power of the wind turbine is low, and the wind turbine may not supply power to the external power grid with the rated power. Therefore, in order to achieve that the output power of the wind turbine in the full load operation state is high enough to enable the wind turbine to supply power to the external power grid with the rated power, the temperature threshold described above is used as a reference point in the embodiment. If both an average value of the first ambient temperatures in a current period and an average value of the first ambient temperatures in a previous period are greater than the temperature threshold, an output power of the wind turbine collected at an end time instant of the current period is compensated based on a difference of the average values of the first ambient temperatures in the current period and the previous period, to ensure the stable output power of the wind turbine.

For example, if the average values of the first ambient temperatures in the current period and the previous period are greater than the temperature threshold and the difference therebetween is small, an absolute value of a power to be compensated is small; and if the difference therebetween is great, the absolute value of the power to be compensated is great. If the average values of the first ambient temperatures in the current period and the previous period are greater than the temperature threshold and the average value of the first ambient temperatures in the current period is greater than the average value of the first ambient temperatures in the previous period, a power to be compensated is positive; and if the average value of the first ambient temperatures in the current period is smaller than the average value of the first ambient temperatures in the previous period, the power to be compensated is negative, thereby ensuring the stable output power of the wind turbine.

The above solution of performing a determination and compensating the output power of the wind turbine based on the temperature threshold can also be applied in a non-full power state of the wind turbine. This is because that a rule of the output power of the wind turbine inversely proportional to the ambient temperature is applicable in any operation state of the wind turbine. Therefore, in the embodiment, when the output power of the wind turbine is compensated, the compensated output power of the wind turbine refers to output powers of the wind turbine in various operation states (the full power state or the non-full power state).

In the embodiment, the power may be compensated by torque compensation, that is, a power to be compensated is converted into an extra torque to be outputted of the wind turbine, thereby improving the output power of the wind turbine. According to a torque control principle of the wind turbine, a maximum torque and a set torque of the wind turbine are to be compensated synchronously when the wind turbine reaches a rated rotational speed and falls within a rated power segment respectively. In the embodiment, the manners for compensating the power are not limited.

With the method for compensating the output power of the wind turbine according to the embodiment of the present disclosure, the output power of the wind turbine is compensated based on the introduced temperature threshold in combination with the change of the output power of the wind turbine with the ambient temperatures, to ensure the stable output power of the wind turbine. The technical solution in the embodiment of the present disclosure may be applied to various types of wind turbine.

Second Embodiment

Figure 2A:
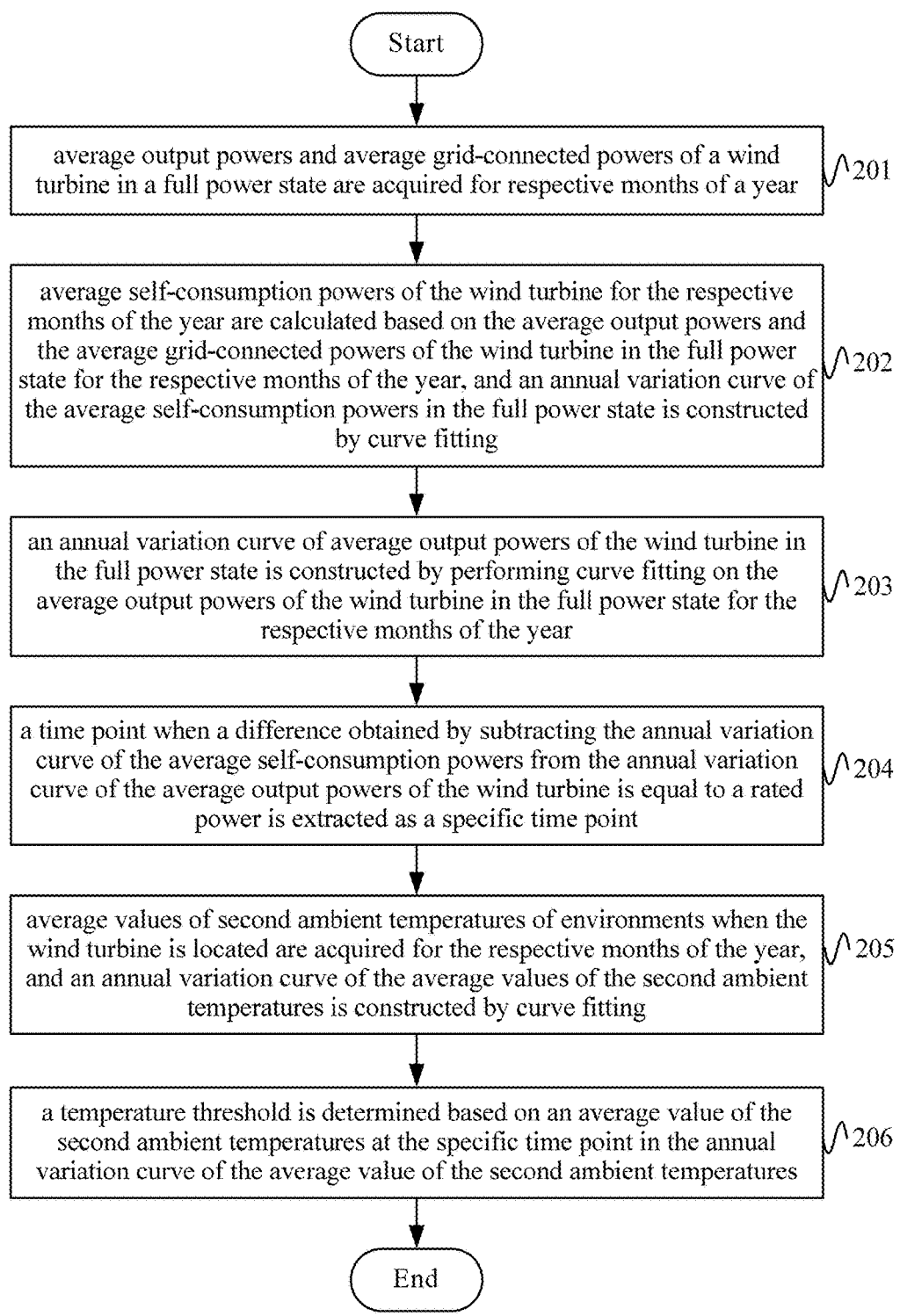
FIG. 2a is a flowchart of a method for acquiring a temperature threshold in the embodiment shown in FIG. 1 according to the present disclosure.

FIG. 2a is a flowchart of a method for acquiring the temperature threshold in the embodiment shown in FIG. 1 according to the present disclosure. As shown in FIG. 2a, the method for acquiring the temperature threshold may include steps S201 to S206 in the following.

In step S201, average output powers and average grid-connected powers of a wind turbine in a full power state are acquired for respective months of a year.

In an actual application scene, an ambient wind speed has a great influence on an output power of the wind turbine, and has an indirectly influence on a grid-connection power of the wind turbine. Therefore, in a process of acquiring the average output powers and the average grid-connection powers of the wind turbine in the full power state for respective months of the year, influence degrees and effects of ambient wind speeds should be considered.

In the embodiment, step S201 may be implemented by the following step 1 to step 3.

In step 1, output powers, grid-connected powers and ambient wind speeds of the wind turbine are collected at respective sampling time instants in the year.

For the three types of collected data above, historical data for an operation of the wind turbine may be used as collection samples. In a specific collection process, all operation transient data in the year (a transient period may be 20 ms, is or 7 s) may be used as sample points, and one sample point corresponds to one sampling time instant. In the embodiment, operation transient data with a transient period of 7 s corresponds to one sampling time instant. At the sampling time instants, historical data for the operation of the wind turbine is collected, to acquire the output powers, the grid-connected powers and the ambient wind speeds of the wind turbine at the sampling time instants.

In step 2, output powers, grid-connected powers and ambient wind speeds of the wind turbine in a full power state at the sampling time instants of the year are counted by months, and average values of the output powers and the grid-connected powers at different ambient wind speed segments are calculated for respective months.

The data may be filtered before being counted, to ensure validity of a final effect, such as eliminating data on the operation of the wind turbine in a limited power and data on a small wind speed (data collected when the ambient wind speed is lower than 2 m/s).

In order to determine the temperature threshold based on the grid-connected power equal to the rated power in subsequent steps, data of the wind turbine in the full power state is to be extracted as data to be processed subsequently in step 2.

In a data processing process, the data collected at the sampling time instants may be grouped based on the ambient wind speeds, and each group corresponds to a fixed ambient wind speed segment. For example, data collected for the ambient wind speed ranging from 4.75 m/s to 5.25 m/s corresponds to an ambient wind speed segment of 5 m/s. Then the extracted output powers, grid-connected powers and ambient wind speeds of the wind turbine in the full power state are counted by months, and average values of the output powers and average values of the grid-connected powers at different ambient wind speed segments are calculated for the respective months. For example, algebraic average values of the output powers and algebraic average values of the grid-connected powers of the wind turbine at different ambient wind speed segments for the respective months may be used as the average values of the output powers and the average values of the grid-connected powers at corresponding wind speed segments.

In step 3, average output powers and average grid-connected powers of the wind turbine for the respective months of the year are acquired based on the average values of the output powers and the grid-connected powers at different ambient wind speed segments for the respective months.

For example, algebraic averages or weighted averages of the output powers and the grid-connected powers at the ambient wind speed segments for the respective months may be used as the average output powers or the average grid-connected powers of the wind turbine in the full power state for the respective months. In the embodiment, the method for acquiring the average output powers or the average grid-connected powers of the wind turbine in the full power state for the respective months is not limited.

In step S202, average self-consumption powers of the wind turbine for the respective months of the year are calculated based on the average output powers and the average grid-connected powers of the wind turbine in the full power state for the respective months of the year, and an annual variation curve of the average self-consumption powers in the full power state is constructed by curve fitting.

Figure 2B:
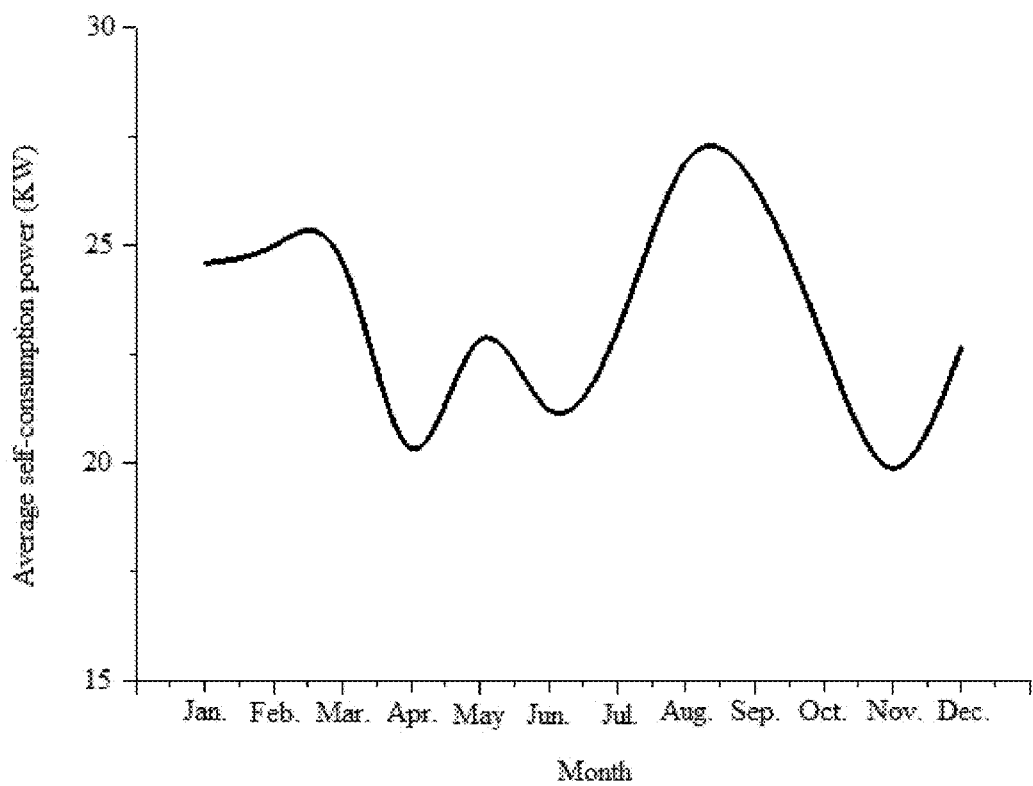
FIG. 2b is a schematic diagram of an annual variation curve of average self-consumption powers in a full power state according to an embodiment of the present disclosure.

For example, a difference between the average output power and the average grid-connected power of the wind turbine in the full power state for each month of the year may be used as the average self-consumption power for the month. Curve fitting is performed on the acquired average self-consumption powers for the respective months in a two-dimensional coordinate system, to form an annual variation curve of the average self-consumption powers in the full power state. FIG. 2b is a schematic diagram of an annual variation curve of the average self-consumption powers in a full power state (a rated power is 1500 KW). As shown in FIG. 2b, horizontal coordinates indicate time, and vertical coordinates indicate average self-consumption powers in a full power state.

In step S203, an annual variation curve of average output powers of the wind turbine in the full power state is constructed by performing curve fitting on the average output powers of the wind turbine in the full power state for the respective months of the year.

Figure 2C:
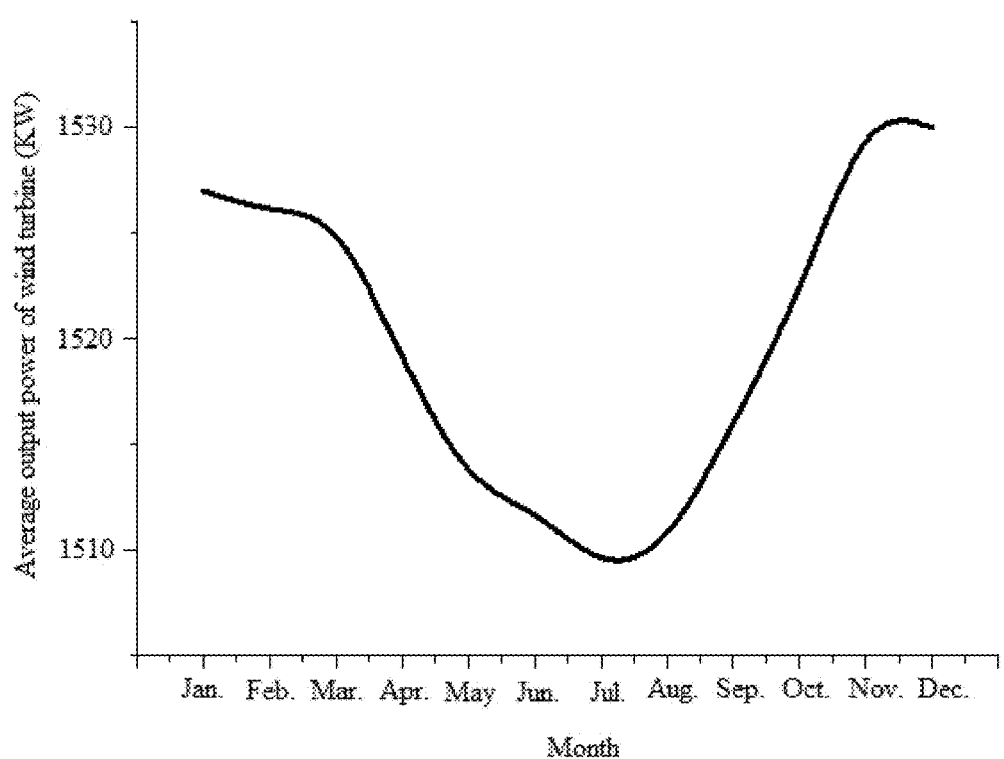
FIG. 2c is a schematic diagram of an annual variation curve of average output powers of a wind turbine in a full power state according to an embodiment of the present disclosure.

FIG. 2c is a schematic diagram of an annual variation curve of average output powers of the wind turbine in a full power state (a rated power is 1500 KW) according to the embodiment. As shown in FIG. 2c, horizontal coordinates indicate time and vertical coordinates indicate average output powers of the wind turbine in the full power state.

In step S204, a time point when a difference obtained by subtracting the annual variation curve of the average self-consumption powers from the annual variation curve of the average output powers of the wind turbine is equal to a rated power is extracted as a specific time point.

For example, a time point when a difference obtained by subtracting a curve value in FIG. 2b from a curve value in FIG. 2c is equal to 1500 KW (the rated power) is determined as the specific time point. As shown in a curve of FIG. 2d, the specific time points are A and B.

In step S205, average values of second ambient temperatures of environments when the wind turbine is located are acquired for the respective months of the year, and an annual variation curve of the average values of the second ambient temperatures is constructed by curve fitting.

Figure 2D:
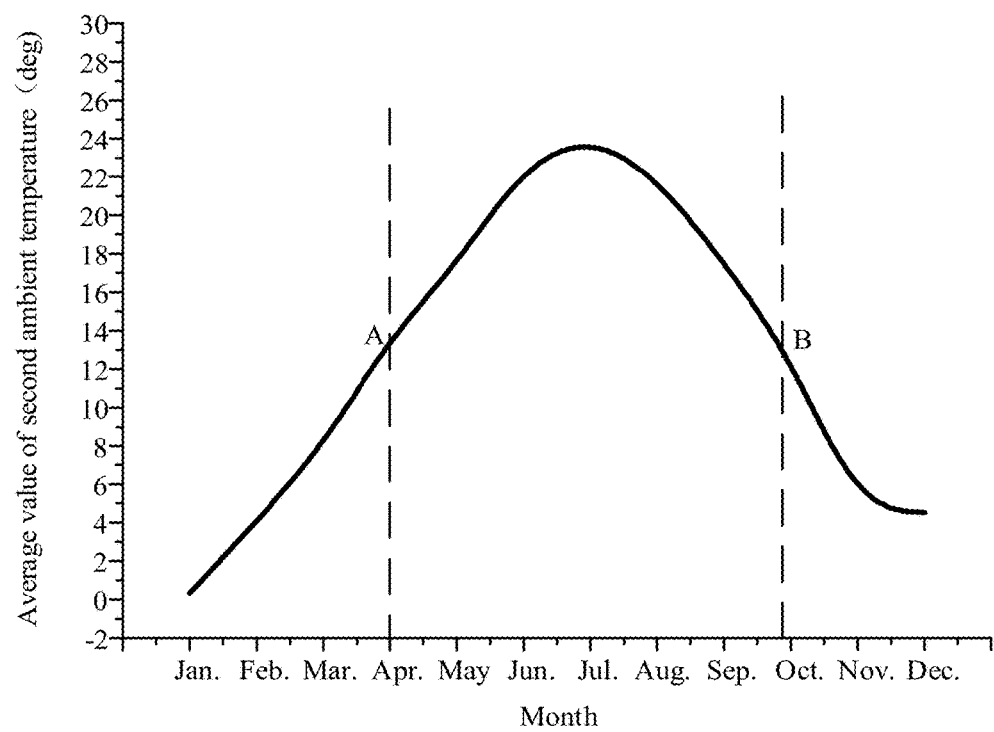
FIG. 2d is a schematic diagram of an annual variation curve of average values of second ambient temperatures according to an embodiment of the present disclosure.

FIG. 2d is a schematic diagram of an annual variation curve of the average values of the second ambient temperatures according to the embodiment. As shown in FIG. 2d, horizontal coordinates indicate time, and vertical coordinates indicate average values of the second ambient temperatures of environments where the wind turbine is located.

In step S206, a temperature threshold is determined based on an average value of the second ambient temperatures at the specific time point in the annual variation curve of the average value of the second ambient temperatures.

For example, referring to FIG. 2d, the specific time points (point A and point B) determined by FIG. 2b and FIG. 2c correspond to a specific average value of the second ambient temperatures, i.e., approximate 13 Celsius degrees in FIG. 2d. Therefore, the above temperature threshold may be set as 13 Celsius degrees.

With the method for acquiring the temperature threshold according to the embodiment of the present disclosure, annual variation curves of the average output powers, the average self-consumption powers, and the average values of the second ambient temperatures of the wind turbine are constructed, the average grid-connected powers of the wind turbine are determined by the annual variation curves of the average output powers and the average self-consumption powers of the wind turbine; the specific time point is determined based on the average grid-connected power equal to the rated power; and the temperature threshold is determined based on the average value of the second ambient temperatures at the specific time point in the annual variation curve of the average values of the second ambient temperatures. In this way, a method for determining the temperature threshold is implemented, and the determined temperature threshold is a great reference.

Third Embodiment

Figure 3:
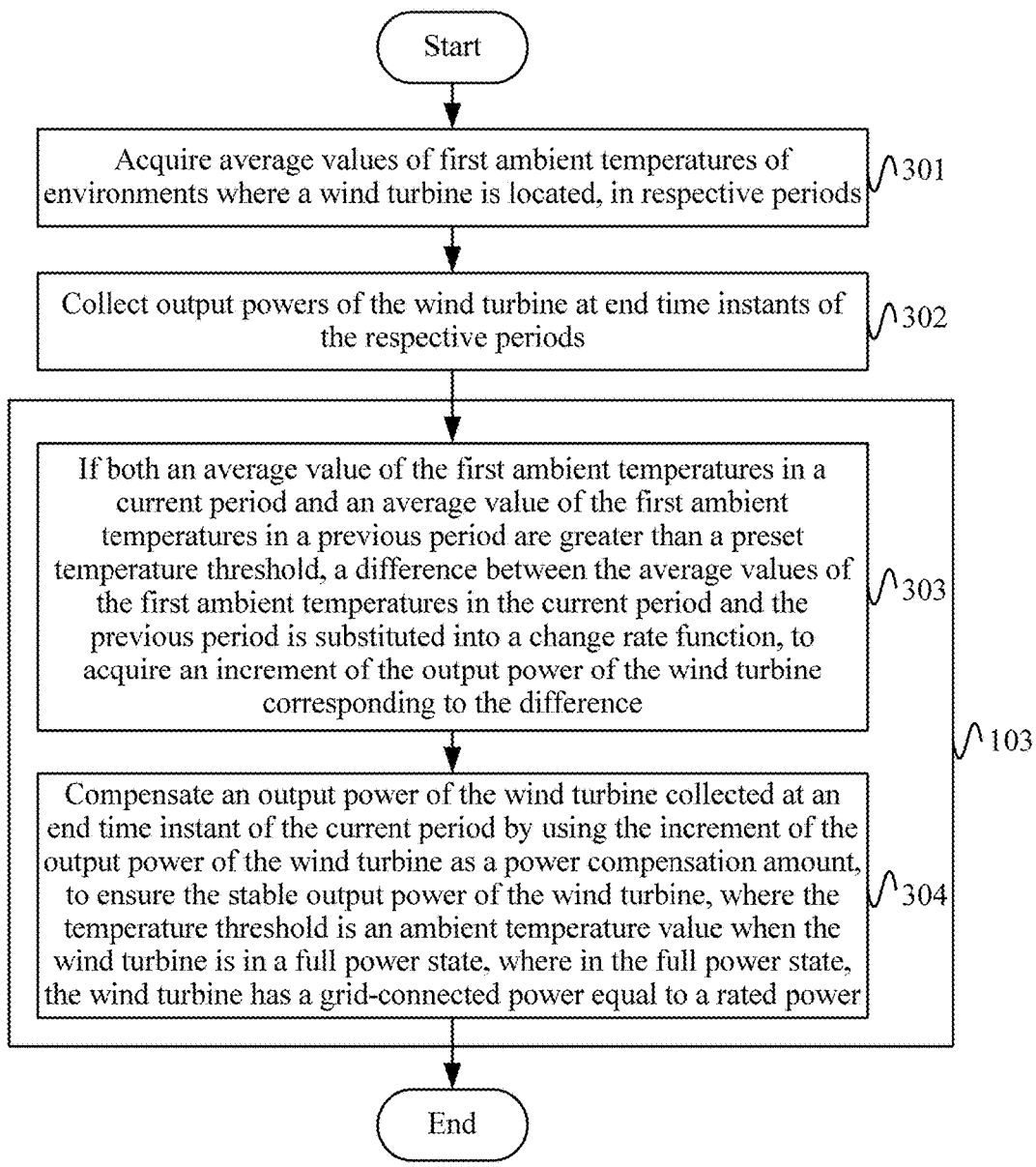
FIG. 3 is a flowchart of a method for compensating an output power of a wind turbine according to another embodiment of the present disclosure.

FIG. 3 is a flowchart of a method for compensating an output power of a wind turbine according to another embodiment of the present disclosure. The method may be regarded as an implementation of the embodiment shown in FIG. 1. As shown in FIG. 3, based on the method embodiment shown in FIG. 1, step S103 is further refined in the embodiment, i.e., introducing a change rate function. Based on related steps of the embodiment shown in FIG. 2a, the method for acquiring the change rate function may include the following steps.

A change rate function for indicating change of the output powers of the wind turbine in the full power state with the second ambient temperatures is calculated, based on the annual variation curve of the average output powers of the wind turbine and the annual variation curve of the average values of the second ambient temperatures obtained in the embodiment shown in FIG. 2a. For example, for the time points in FIG. 2c and FIG. 2d, a limited number of arrays, each of them including the average output power of the wind turbine and the average value of the second ambient temperatures, are selected; straight line fitting is performed on the arrays in a two-dimensional coordinate system, to form a straight line indicated by a function $y=p*x+q$, thereby determining $\Delta y=p*\Delta x$ as the above change rate function. In which, p and q are constants; x and $\Delta x$ indicate an average value of the second ambient temperatures and an increment thereof; and y and $\Delta y$ indicate an average output power of the wind turbine and an increment thereof.

Based on the introduced change rate function, the method for compensating the output power of the wind turbine shown in FIG. 3 may include steps S301 to step 304.

In step S301, average values of first ambient temperatures of environments where a wind turbine is located are acquired in respective periods.

In step S302, output powers of the wind turbine are collected at end time instants of the periods.

The performing process of above steps S301 to step S302 may refer to corresponding description of steps S101 to S102.

In step S303, if both an average value of the first ambient temperatures in a current period and an average value of the first ambient temperatures in a previous period are greater than a preset temperature threshold, a difference between the average values of the first ambient temperatures in the current period and the previous period is substituted into a change rate function, to obtain an increment of an output power of the wind turbine corresponding to the difference.

For example, the difference between the average values of the first ambient temperatures in the current period and the previous period (an increment of the average value of the first ambient temperatures in the previous period), as an increment $\Delta x$, is substituted into the change rate function $\Delta y=p*\Delta x$, to obtain an increment $\Delta y$ of the average output power of the wind turbine corresponding to the difference, as the increment of the output power of the wind turbine.

In step S304, an output power of the wind turbine collected at an end time instant of the current period is compensated by using the increment of the output power of the wind turbine as a power compensation amount, to ensure the stable output power of the wind turbine. The temperature threshold is an ambient temperature value when the wind turbine is in a full power state, where in the full power state, the wind turbine has a grid-connected power equal to a rated power.

The compensation manners and principles may refer to corresponding description of step S103, which is not described in detail herein.

The steps S303 to S304 may be regarded as refinement of step S103.

With the method for compensating the output power of the wind turbine according to the embodiment of the present disclosure, based on the embodiment shown in FIG. 1, the change rate function is introduced, and the difference between the average values of the first ambient temperatures in the current period and the previous period is substituted into the change rate function, to calculate a value of the power to be compensated, such that the output power of the wind turbine is compensated more accurately. In the solution of the embodiment, the process of obtaining the power compensation amount may be further corrected and optimized by using the temperature threshold calculated by the method shown in FIG. 2a.

Fourth Embodiment

Figure 4A:
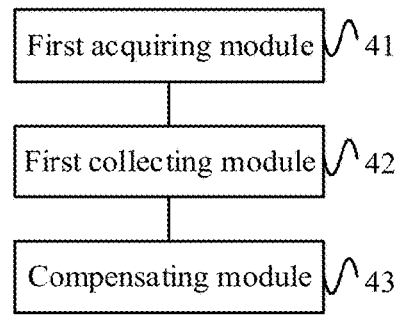
FIG. 4a is a schematic structural diagram of a device for compensating an output power of a wind turbine according to an embodiment of the present disclosure.

FIG. 4a is a schematic structural diagram of a device for compensating an output power of a wind turbine according to an embodiment of the present disclosure. The device may be used to perform the steps of the method in the embodiment shown in FIG. 1. As shown in FIG. 4a, the device for compensating the output power of the wind turbine includes: a first acquiring module 41, a first collecting module 42 and a compensating module 43.

The first acquiring module 41 is configured to acquire average values of first ambient temperatures of environments where the wind turbine is located, in respective periods.

The first collecting module 42 is configured to collect output powers of the wind turbine at end time instants of the respective periods.

The compensating module 43 is configured to if both an average value of the first ambient temperatures in a current period and an average value of the first ambient temperatures in a previous period are greater than a preset temperature threshold, compensate an output power of the wind turbine collected at an end time instant of the current period based on a difference of the average values of the first ambient temperatures in the current period and the previous period, to ensure the stable output power of the wind turbine. The temperature threshold is an ambient temperature value when the wind turbine is in a full power state, where in the full power state, the wind turbine has a grid-connected power equal to a rated power.

Figure 4B:
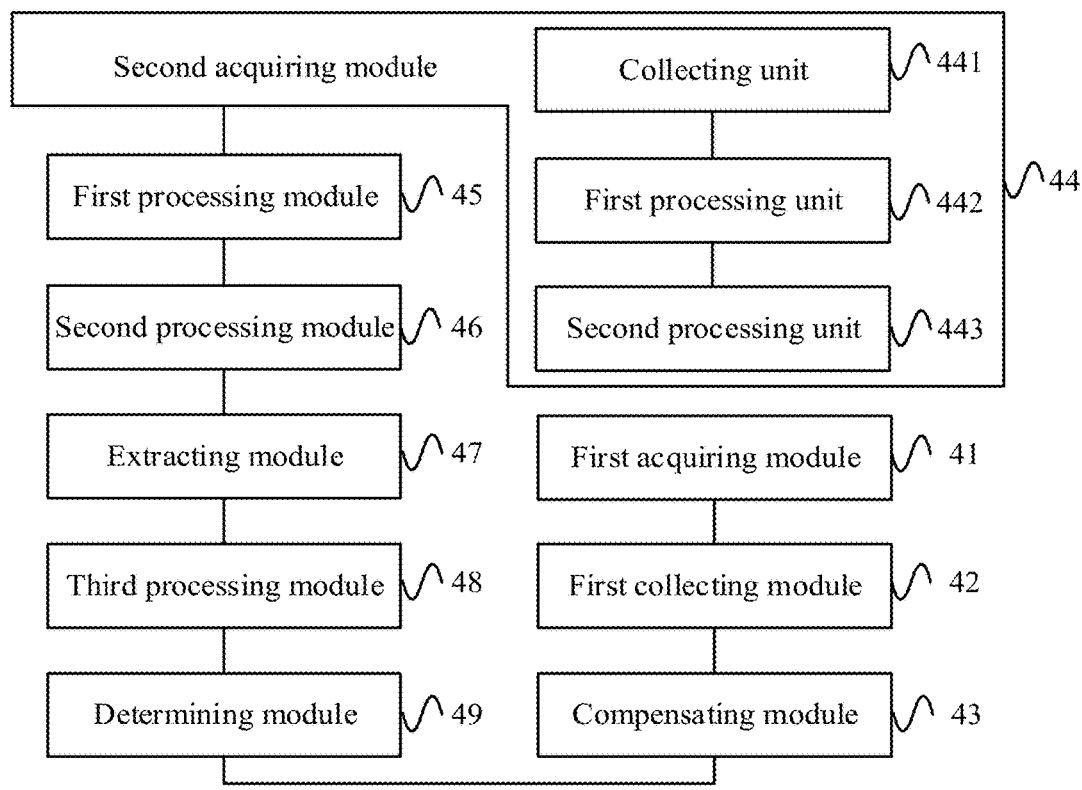
FIG. 4b is a schematic structural diagram of a device for compensating an output power of a wind turbine according to another embodiment of the present disclosure.

As shown in FIG. 4b, based on the embodiment shown in FIG. 4a, the device for compensating the output power of the wind turbine may further include: a second acquiring module 44, a first processing module 45, a second processing module 46, an extracting module 47, a third processing module 48 and a determining module 49.

The second acquiring module 44 is configured to acquire average output powers and average grid-connected powers of the wind turbine in a full power state for respective months of one year.

The first processing module 45 is configured to calculate average self-consumption powers of the wind turbine in the respective months of the year based on the average output powers and the average grid-connected powers of the wind turbine in the full power state for the respective months of the year, and construct an annual variation curve of the average self-consumption powers in the full power state by curve fitting.

The second processing module 46 is configured to construct an annual variation curve of the average output powers of the wind turbine in the full power state by performing curve fitting on the average output powers of the wind turbine in the full power state for the respective months of the year.

The extracting module 47 is configured to extract a time point when a difference obtained by subtracting the annual variation curve of the average self-consumption powers from the annual variation curve of the average output powers of the wind turbine is equal to a rated power, as a specific time point.

The third processing module 48 is configured to acquire average values of second ambient temperatures of environments where the wind turbine is located in the full power state for the respective months of the year, and construct an annual variation curve of the average values of the second ambient temperatures in the full power state by curve fitting.

The determining module 49 is configured to determine the temperature threshold based on an average value of the second ambient temperatures at the specific time point in the annual variation curve of the average values of the second ambient temperatures.

Further, the second acquiring module 44 may include a collecting unit 441, a first processing unit 442 and a second processing unit 443.

The collecting unit 441 is configured to collect output powers, grid-connected powers and ambient wind speeds of the wind turbine at sampling time instants in one year.

The first processing unit 442 is configured to count, for the respective months, the output powers, the grid-connected powers and the ambient wind speeds of the wind turbine in the full power state collected at the sampling time instants in the year, and calculate average values of the output powers and the grid-connected powers of the wind turbine at different ambient wind speed segments for the respective months.

The second processing unit 443 is configured to acquire average output powers and average grid-connected powers of the wind turbine in the full power state for the respective months of the year, based on the average values of the output powers and the grid-connected powers of the wind turbine at different ambient wind speed segments for the respective months.

The steps of the method in the embodiment shown in FIG. 2a may be performed by the device for compensating the output power of the wind turbine shown in FIG. 4b. The principle of the steps is not described in detail here.

Figure 4C:
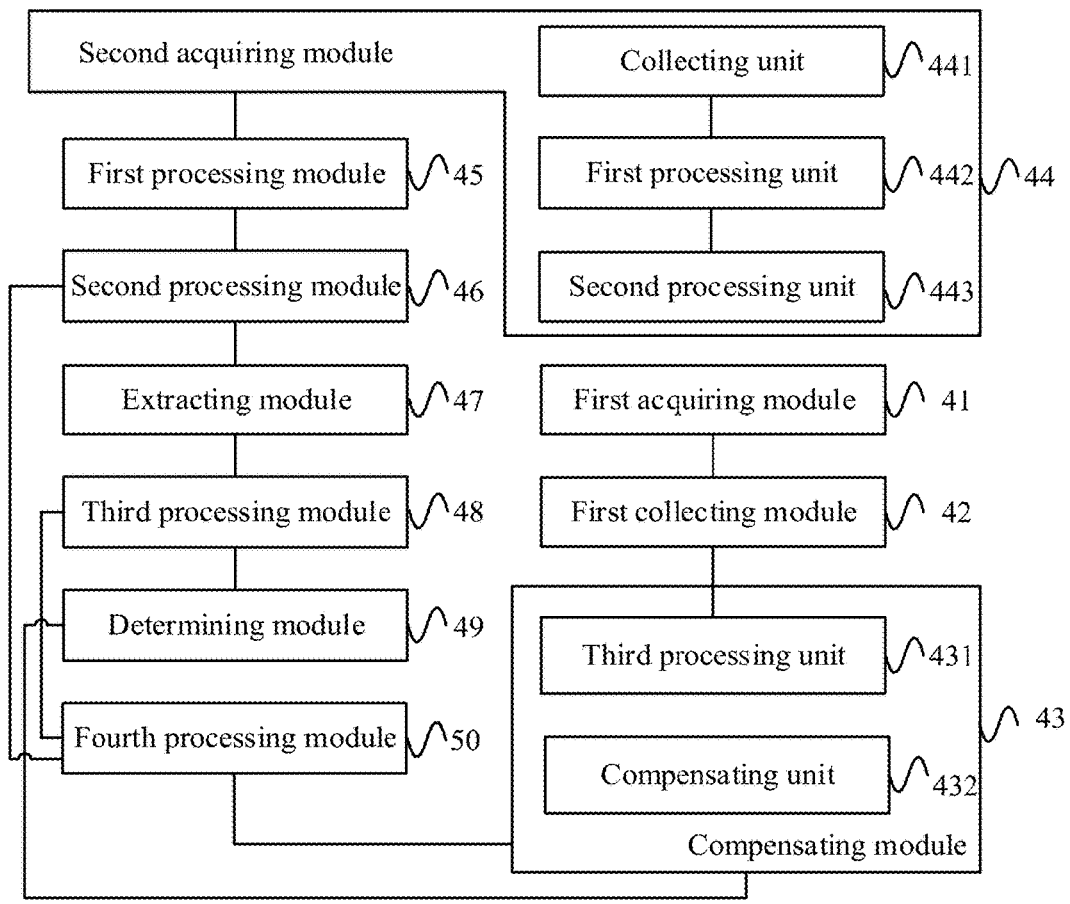
FIG. 4c is a schematic structural diagram of a device for compensating an output power of a wind turbine according to another embodiment of the present disclosure.

Further, as shown in FIG. 4c, based on the embodiment shown in FIG. 4b, the device for compensating the output power of the wind turbine may include: a fourth processing module 50.

The fourth processing module 50 is configured to calculate a change rate function for indicating a change of the output powers of the wind turbine in the full power state with the second ambient temperatures, based on the annual variation curve of the average output powers of the wind turbine and the annual variation curve of the average values of the second ambient temperatures.

Further, in an embodiment shown in FIG. 4c, the compensating module 43 may include a third processing unit 431 and a compensating unit 432.

The third processing unit 431 is configured to substitute a difference between the average values of the first ambient temperatures in the current period and the previous period into the change rate function, to acquire an increment of the output power of the wind turbine corresponding to the difference.

The compensating unit 432 is configured to compensate an output power of the wind turbine collected at an end time instant of the current period by using the increment of the output power of the wind turbine as a power compensation amount.

The steps of the method in the embodiment shown in FIG. 3 may be performed by the device for compensating the output power of the wind turbine shown in FIG. 4c. The principle of the steps is not described in detail herein.

Technical effects achieved by performing the methods in FIG. 2a and FIG. 3 by the device for compensating the output power of the wind turbine according to the embodiment of the present disclosure have been described in the second embodiment and the third embodiment, which are not described in detail herein.

Figure 5A:
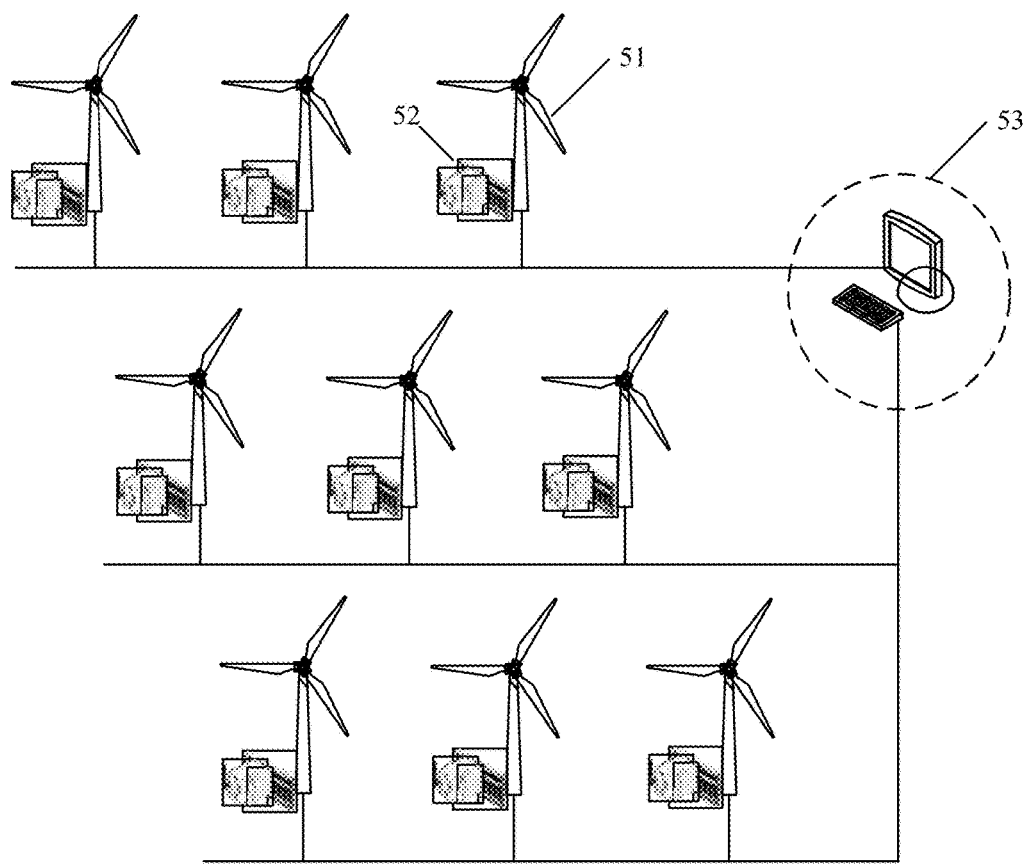
FIG. 5a is a schematic structural diagram of a system for compensating an output power of a wind turbine according to an embodiment of the present disclosure.
Figure 5B:
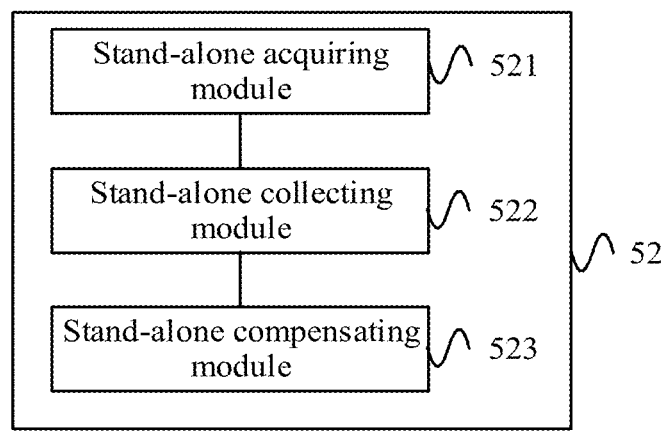
FIG. 5b is a schematic structural diagram of a stand-alone controller in a system for compensating an output power of a wind turbine according to the present disclosure.
Figure 5C:
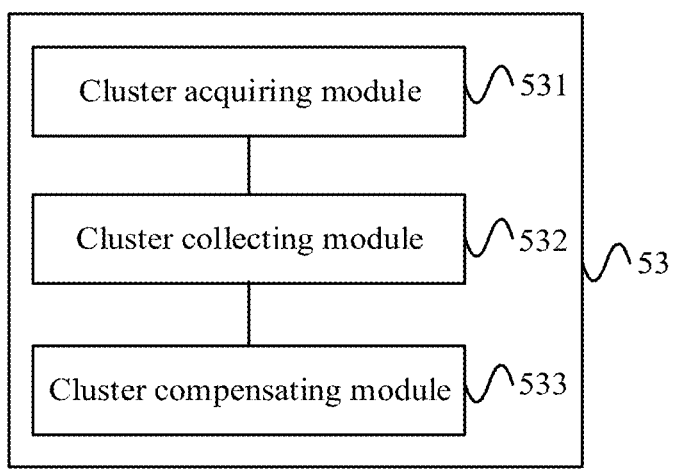
FIG. 5c is a schematic structural diagram of a cluster controller in a system for compensating an output power of a wind turbine according to the present disclosure.

As shown in FIG. 5a, FIG. 5b and FIG. 5c, a system for compensating an output power of a wind turbine is further provided according to an embodiment. The system includes: a cluster controller 53, and stand-alone controllers 52 respectively provided on wind turbines 51.

Each of the stand-alone controllers 52 includes a stand-alone acquiring module 521, a stand-alone collecting module 522 and a stand-alone compensating module 523.

The stand-alone acquiring module 521 is configured to acquire average values of first ambient temperatures of environments where the wind turbine is located, in respective periods.

The stand-alone collecting module 522 is configured to collect output powers of the wind turbine at end time instants of the respective periods.

The stand-alone compensating module 523 is configured to compensate an output power of the wind turbine collected at an end time instant of a current period in response to a control of the cluster controller.

The cluster controller 53 includes a cluster acquiring module 531, a cluster collecting module 532 and a cluster compensating module 533.

The cluster acquiring module 531 is configured to acquire, from a stand-alone controller, average values of the first ambient temperatures of environments where a wind turbine including the stand-alone controller is located, in respective periods.

The cluster collecting module 532 is configured to collect output powers of the wind turbine at end time instants of the respective periods from the stand-alone controllers.

The cluster compensating module 533 is configured to if both an average value of the first ambient temperatures of the wind turbine in a current period and an average value of the first ambient temperatures in a previous period are greater than a preset temperature threshold of a corresponding wind turbine, control a corresponding stand-alone controller to compensate an output power of the wind turbine collected at an end time instant of the current period based on a difference of the average values of the first ambient temperatures of the wind turbine in the current period and the previous period, to ensure a stable output power of the wind turbine. The temperature threshold is an ambient temperature value when the wind turbine is in a full power state; where in the full power state, the wind turbine has a grid-connected power equal to a rated power.

The stand-alone controller 52 may be a compensating system provided at the wind turbine 51 and configured to control an operation of the wind turbine 51. The cluster controller 53 may be a main control system applied to a whole wind power station and configured to adjust and control the stand-alone controllers 52 in the wind power station.

The steps of the methods in the embodiments shown in FIG. 1, FIG. 2a and FIG. 3 may be performed by the system for compensating the output power of the wind turbine according to the embodiment. The principle of the steps is not described in detail here.

With the system for compensating the output power of the wind turbine according to the embodiment, first output powers of all wind turbines in one wind power station at a current time instant can be compensated based on personalization data of the wind turbines, thereby improving cluster control operability of the wind power station.

It should be noted that, the embodiments described above are only used to illustrate the technical solutions of the present disclosure and are not intended to limit the present disclosure. Although the present disclosure is described in detail with reference to the embodiments described above, those skilled in the art should understand that the technical solutions recited in the embodiments may be changed or a part or all of the technical features in the embodiments may be replaced equivalently. The changes and replacements do not enable the essence of the corresponding technical solutions to depart from the scope of the technical solutions in the embodiments of the present disclosure.

The invention claimed is:

1. A method for compensating an electrical output power of a wind turbine, comprising:
acquiring average values of first ambient temperatures of environments where the wind turbine is located, in respective periods;
collecting electrical output powers of the wind turbine at end time instants of the respective periods; and
if both an average value of the first ambient temperatures in a current period and an average value of the first ambient temperatures in a previous period are greater than a preset temperature threshold, compensating an electrical output power of the wind turbine collected at an end time instant of the current period based on a difference between the average values of the first ambient temperatures in the current period and the previous period, to ensure a stable electrical output power of the wind turbine, wherein the temperature threshold is an ambient temperature value when the wind turbine is in a full power state; and wherein in the full power state, the wind turbine has a grid-connected power equal to a rated power of the wind turbine.

2. The method according to claim 1, further comprising:
acquiring average electrical output powers and average grid-connected powers of the wind turbine in the full power state for respective months of one year;
calculating average self-consumption powers of the wind turbine for the respective months of the year based on the average electrical output powers and the average grid-connected powers of the wind turbine in the full power state for the respective months of the year, and constructing, by curve fitting, an annual variation curve of the average self-consumption powers in the full power state;
constructing an annual variation curve of the average electrical output powers of the wind turbine in the full power state by performing curve fitting on the average electrical output powers of the wind turbine in the full power state for the respective months of the year;
extracting a time point when a difference obtained by subtracting the annual variation curve of the average self-consumption powers from the annual variation curve of the average electrical output powers of the wind turbine is equal to the rated power, as a specific time point;
acquiring average values of second ambient temperatures of environments where the wind turbine is located for the respective months of the year, in the full power state; and constructing, by curve fitting, an annual variation curve of the average values of the second ambient temperatures in the full power state; and
determining the temperature threshold, based on an average value of the second ambient temperatures at the specific time point in the annual variation curve of the average values of the second ambient temperatures.

3. The method according to claim 2, wherein the acquiring average electrical output powers and average grid-connected powers of the wind turbine in the full power state for the respective months of one year comprises:
collecting electrical output powers, grid-connected powers and ambient wind speeds of the wind turbine at sampling time instants in the year;
counting, by months, the electrical output powers, grid-connected powers and ambient wind speeds of the wind turbine in the full power state collected at the sampling time instants in the year, and calculating average values of the electrical output powers and average values of the grid-connected powers at different ambient wind speed segments for the respective months; and
acquiring average electrical output powers and average grid-connected powers of the wind turbine in the full power state for the respective months of the year, based on the average values of the electrical output powers and the average values of the grid-connected powers of the wind turbine at different ambient wind speed segments for the respective months.

4. The method according to claim 3, further comprising:
calculating a change rate function for indicating change of the electrical output powers of the wind turbine in the full power state with the second ambient temperatures, based on the annual variation curve of the average electrical output powers and the annual variation curve of the average values of the second ambient temperatures.

5. The method according to claim 4, wherein the compensating an electrical output power of the wind turbine collected at an end time instant of the current period based on a difference between the average values of the first ambient temperatures in the current period and the previous period comprises:
substituting the difference between the average values of the first ambient temperatures in the current period and the previous period into the change rate function, to acquire an increment of the electrical output power of the wind turbine corresponding to the difference; and compensating the electrical output power of the wind turbine collected at the end time instant of the current period by using the increment of the electrical output power of the wind turbine as a power compensation amount.

6. A device for compensating an electrical output power of a wind turbine, comprising:
a first acquiring module configured to acquire average values of first ambient temperatures of environments where the wind turbine is located, in respective periods;
a first collecting module configured to collect electrical output powers of the wind turbine at end time instants of the respective periods; and
a compensating module configured to if both an average value of the first ambient temperatures in a current period and an average value of the first ambient temperatures in a previous period are greater than a preset temperature threshold, compensate an electrical output power of the wind turbine collected at an end time instant of the current period based on a difference of the average values of the first ambient temperatures in the current period and the previous period, to ensure a stable electrical output power of the wind turbine, wherein the temperature threshold is an ambient temperature value when the wind turbine is in a full power state; and wherein in the full power state, the wind turbine has a grid-connected power equal to a rated power of the wind turbine.

7. The device according to claim 6, further comprising:
a second acquiring module configured to acquire average electrical output powers and average grid-connected powers of the wind turbine in a full power state for respective months of one year;
a first processing module configured to calculate average self-consumption powers of the wind turbine for the respective months of the year based on the average electrical output powers and the average grid-connected powers of the wind turbine in the full power state for the respective months of the year, and construct, by curve fitting, an annual variation curve of the self-consumption powers in the full power state;
a second processing module configured to construct an annual variation curve of the average electrical output powers of the wind turbine in the full power state by performing curve fitting on the average electrical output powers of the wind turbine in the full power state for the respective months of the year;
an extracting module configured to extract a time point when a difference obtained by subtracting the annual variation curve of the self-consumption powers from the annual variation curve of the average electrical output powers of the wind turbine is equal to the rated power, as a specific time point;
a third processing module configured to acquire average values of second ambient temperatures of environments where the wind turbine is located for the respective months of the year, in the full power state; and construct, by curve fitting, an annual variation curve of the average values of the second ambient temperatures in the full power state for the year; and
a determining module configured to determine the temperature threshold based on an average value of the second ambient temperatures at the specific time point in the annual variation curve of the average values of the second ambient temperatures.

8. The device according to claim 7, wherein the second acquiring module comprises:

a collecting unit configured to collect electrical output powers, grid-connected powers and ambient wind speeds of the wind turbine at sampling time instants in the year;
a first processing unit configured to count, by months, the electrical output powers, the grid-connected powers and the ambient wind speeds of the wind turbine in the full power state collected at the sampling time instants in the year, and calculate average values of the electrical output powers and average values of the grid-connected powers of the wind turbine at different ambient wind speed segments for the respective months; and
a second processing unit configured to acquire average electrical output powers and average grid-connected powers of the wind turbine in the full power state for the respective months of the year, based on the average values of the electrical output powers and the average values of the grid-connected powers of the wind turbine at different ambient wind speed segments for the respective months.

9. The device according to claim 8, further comprising:
a fourth processing module configured to calculate a change rate function for indicating change of the electrical output powers of the wind turbine in the full power state with the second ambient temperatures based on the annual variation curve of the average electrical output powers of the wind turbine and the annual variation curve of the average values of the second ambient temperatures.

10. The device according to claim 9, wherein the compensating module comprises:
a third processing unit configured to substitute the difference between the average values of the first ambient temperatures in the current period and the previous period into the change rate function, to acquire an increment of the electrical output powers of the wind turbine corresponding to the difference; and
a compensating unit configured to compensate an electrical output power of the wind turbine collected at an end time instant of the current period by using the increment of the electrical output powers of the wind turbine as a power compensation amount.

11. A system for compensating electrical output powers of wind turbines, comprising a cluster controller and stand-alone controllers provided at the wind turbines, wherein each of the stand-alone controllers comprises:
a stand-alone acquiring module configured to acquire average values of first ambient temperatures of environments where the wind turbine is located, in respective periods;
a stand-alone collecting module configured to collect electrical output powers of the wind turbine at end time instants of the respective periods; and a stand-alone compensating module configured to compensate an electrical output power of the wind turbine collected at an end time instant of a current period in response to a control of the cluster controller, and
the cluster controller comprises:
a cluster acquiring module configured to acquire, from the stand-alone controller, the average values of the first ambient temperatures of the environments where the wind turbine comprising the stand-alone controller is located, in the respective periods;

a cluster collecting module configured to collect the electrical output powers of the wind turbine at the end time instants of the respective periods from the stand-alone controller; and a cluster compensating module configured to if both an average value of the first ambient temperatures of the wind turbine in a current period and an average value of the first ambient temperatures in a previous period are greater than a preset temperature threshold of the wind turbine, control a corresponding stand-alone controller to compensate an electrical output power of the wind turbine collected at an end time instant of the current period based on a difference between the average values of the first ambient temperatures of the wind turbine in the current period and the previous period, to ensure a stable electrical output power of the wind turbine, wherein the temperature threshold is an ambient temperature value when the wind turbine is in a full power state; and wherein in the full power state, the wind turbine has a grid-connected power equal to a rated power of the wind turbine.

* * * * *